(12) United States Patent  (10) Patent No.: US 8,891,112 B2
Sato  (45) Date of Patent: Nov. 18, 2014

(54) INFORMATION PROCESSING APPARATUS AND RECORDING MEDIUM FOR INCREASING PRECISION IN DETECTING BLANK SPACE

(75) Inventor: Koji Sato, Fujisawa (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 376 days.

(21) Appl. No.: 13/037,426

(22) Filed: Mar. 1, 2011

(65) Prior Publication Data

US 2011/0211225 A1 Sep. 1, 2011

(30) Foreign Application Priority Data

Mar. 1, 2010 (JP) ................................ 2010-043660

(51) Int. Cl.
*G06F 3/12* (2006.01)
(52) U.S. Cl.
CPC ............ *G06F 3/1252* (2013.01); *G06F 3/1219* (2013.01)
USPC ........ 358/1.15; 358/1.13; 358/1.18; 382/176; 382/181; 382/173
(58) Field of Classification Search
USPC ........ 358/1.15, 1.13, 1.18; 382/176, 181, 173
See application file for complete search history.

(56) References Cited

U.S. PATENT DOCUMENTS

2003/0107770 A1* 6/2003 Klatchko et al. ............. 358/3.21
2007/0171456 A1* 7/2007 Shimazaki ................... 358/1.14
2008/0159650 A1* 7/2008 Odamaki ..................... 382/283
2008/0291492 A1 11/2008 Miyagi et al.
2009/0109492 A1* 4/2009 Hikosaka ..................... 358/3.28

FOREIGN PATENT DOCUMENTS

| JP | 9-284490 A | 10/1997 |
|---|---|---|
| JP | 2003-305915 A | 10/2003 |
| JP | 2004-102393 A | 4/2004 |
| JP | 2006-164151 A | 6/2006 |
| JP | 2006164151 A * | 6/2006 |
| JP | 2008-242935 A | 10/2008 |
| JP | 2008293105 A | 12/2008 |
| JP | 2009-145979 A | 7/2009 |
| JP | 2009152956 A | 7/2009 |

OTHER PUBLICATIONS

Office Action (Notification of Refusal) issued on Oct. 8, 2013, by the Japanese Patent Office in corresponding Japanese Patent Application No. 2010-043660, and an English Translation of the Office Action. (15 pages).
Japanese Office Action (Notification of Refusal) dated May 9, 2014, issued by the Japanese Patent Office in corresponding Japanese Patent Application No. 2010-043660, and an English language translation of Office Action.

* cited by examiner

*Primary Examiner* — Jacky X Zheng
(74) *Attorney, Agent, or Firm* — Buchanan Ingersoll & Rooney PC

(57) ABSTRACT

An information processing apparatus for performing image processing for document data created by a document creation application to generate print data of each page and sending the generated print data to an image forming apparatus, the information processing apparatus including: a control section for specifying, based on document data, a region where drawing object data included in the document data exists as a drawing object region, and detecting blank space in each print page based on the specified drawing object region.

18 Claims, 17 Drawing Sheets

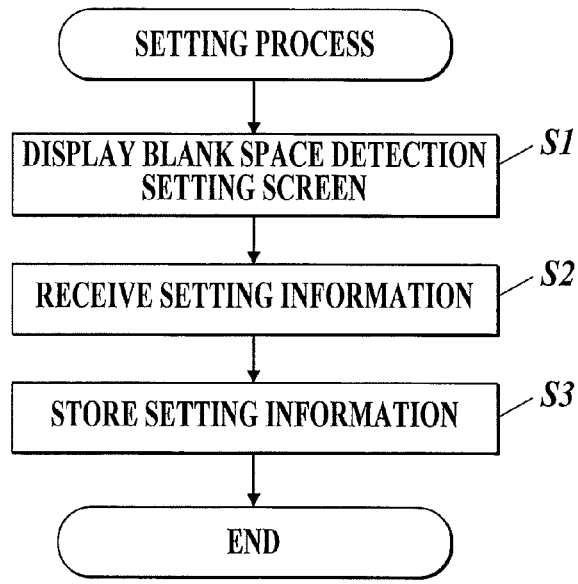
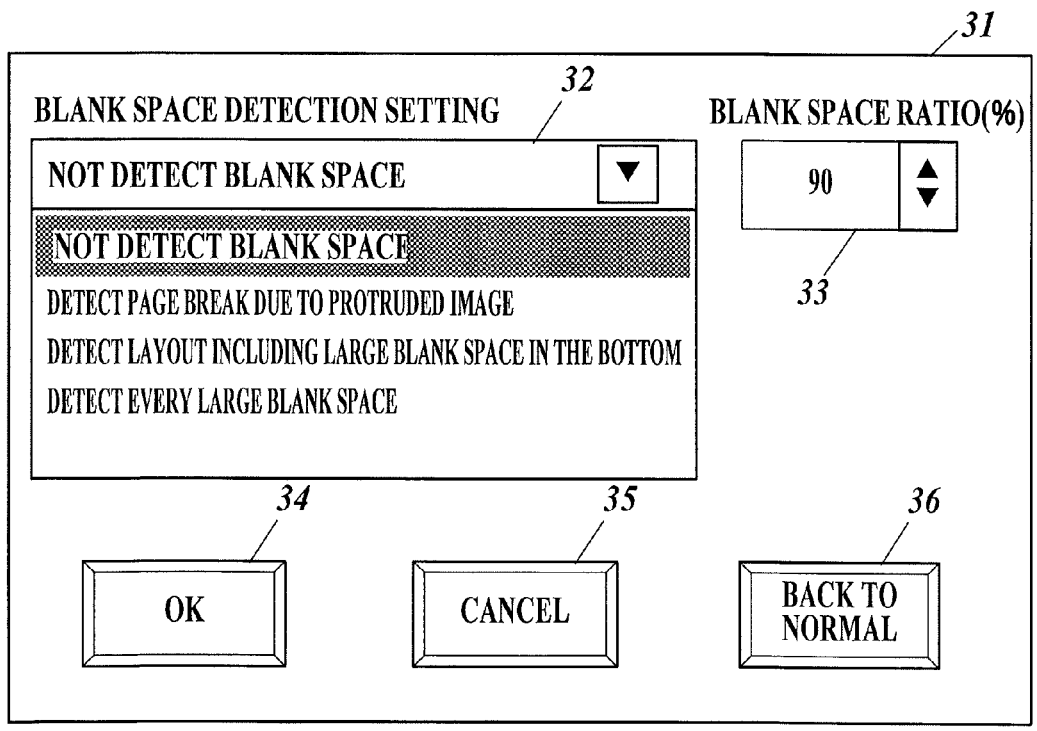

FIG.10A
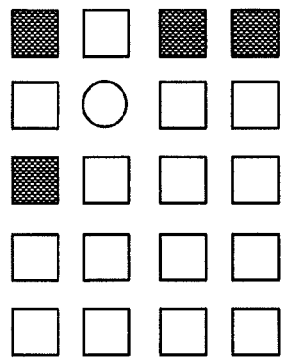
FIG.10B
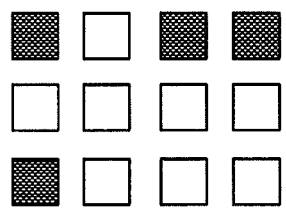
FIG.10C
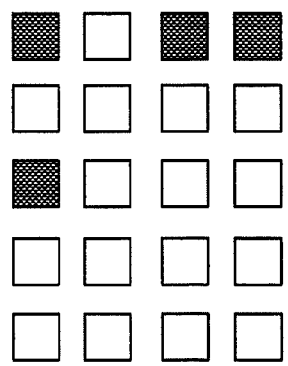

FIG.15
(PAGE 1) 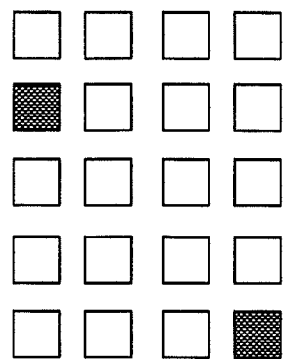
(PAGE 2) 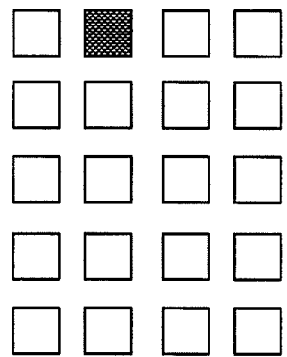
(PAGE 3) 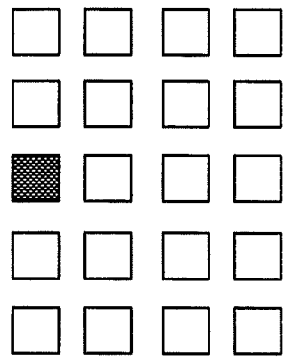
(PAGE 4) 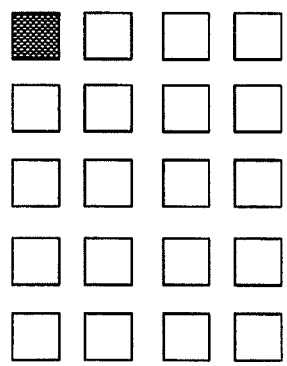

FIG.17
(PAGE 1)  (NL)
 (NL)
 (NP)
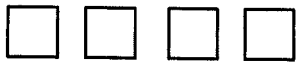
(PAGE 2)  (NL)
 (NL)
 (NL)

FIG. 18
(PAGE 1) 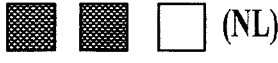 (NL)
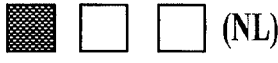 (NL)
(PAGE 2) 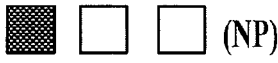 (NP)
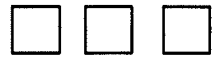
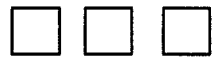
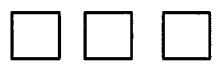
(PAGE 3) 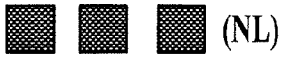 (NL)
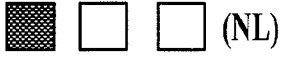 (NL)
 (NL)
(PAGE 4) 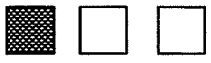
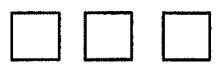
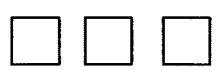
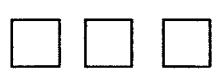

FIG. 20
(PAGE 1)  (NL)
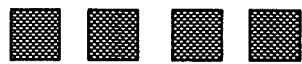
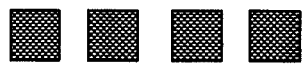
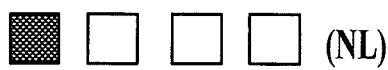 (NL)
(PAGE 2)  (NP)
(PAGE 3)  (NL)
 (NL)
 (NL)
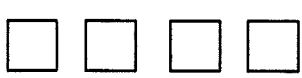

FIG.21
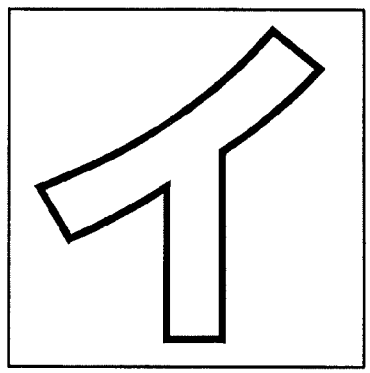
FIG.22
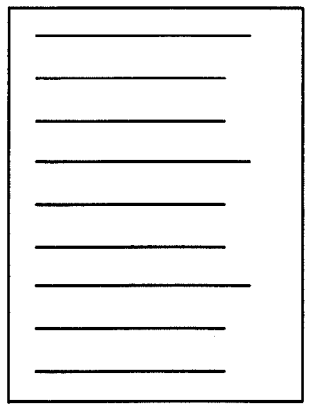 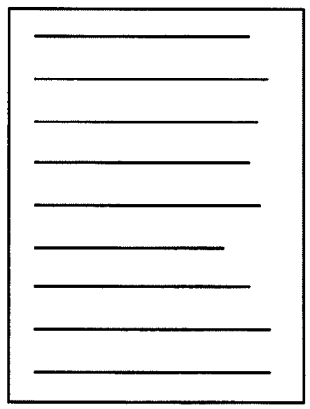 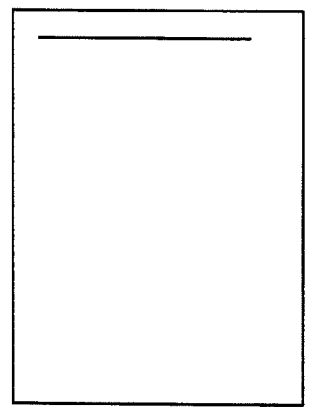

FIG.23
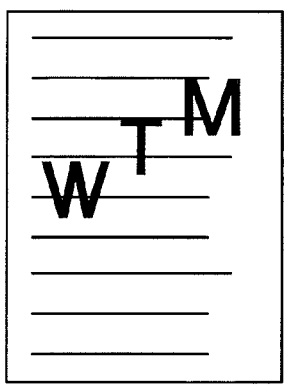 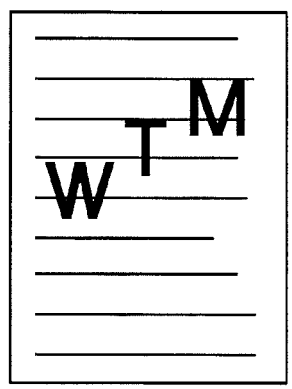 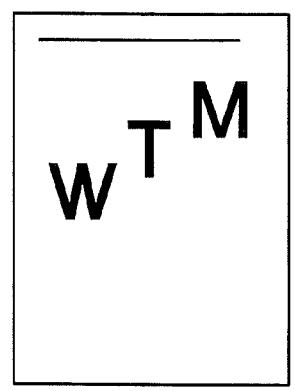

INFORMATION PROCESSING APPARATUS AND RECORDING MEDIUM FOR INCREASING PRECISION IN DETECTING BLANK SPACE

BACKGROUND OF THE INVENTION

1. Field of the Invention

The present invention relates to an information processing apparatus and a recording medium.

2. Description of Related Art

In recent years, there is an increasing interest in ecology. The techniques capable of preventing waste of paper before performing print of paper (before printing) have attracted attentions.

For example, if a user can check a print preview screen before printing, the user can find such an inefficient page layout that there is large blank space in a page. This can prevent waste of paper before printing. However, when print data to be printed is large, it takes time and efforts of the user to check the page layout of every page on the print preview screen. Accordingly, it has been desired to realize a technique to automatically detect inefficient page layout without requiring the user to spend time and efforts.

In the techniques to detect an inefficient page layout, there is a highly precise and user friendly technique to support saving of blank sheets of paper by using detailed settings of colors and the ratio of blank sheets of paper (see Japanese Patent Application Laid-open Publication No. 2006-164151, for example).

In another known technique to prevent waste of paper, if image data is determined to be equivalent to a blank document, the image of the document is not visibly outputted (see Japanese Patent Application Laid-open Publication No. 9-284490, for example).

Moreover, in still another known technique, an image processing apparatus is provided with a blank space region detector. The image processing apparatus is configured to select a blank space region based on the result of blank space detection and insert selected print data into the selected blank space region, thus improving the efficiency and convenience in editing documents (see Japanese Patent Application Laid-open Publication No. 2004-102393, for example).

Furthermore, in still another known technique, a printer driver divides the document previously laid out into pages according to the page layout previously set and lays out the divided pages according to the printer driver's layout, thus easily achieving an output having layout intended by a user (see Japanese Patent Application Laid-open Publication No. 2009-145979, for example).

However, the techniques of the aforementioned patent documents are configured to detect a blank space in print data. Accordingly, these techniques have low precision in detecting blank space and therefore cannot prevent waste of paper.

For example, it is assumed that document data is created by a document creation application (for example, MS-Word (registered trademark), MS-Excel (registered trademark), and the like) in a personal computer (PC). FIG. 22 shows an example of the document data created by the document creation application. The horizontal lines shown in FIG. 22 represent drawing object data (text data or image data) in the document. In this case, most of the third page is a blank space (which is a large blank space page). The document data is subjected to image processing (watermarking, N-up processing, and zoom-in and -out processing, for example.) into print data. For example, if the document data of FIG. 22 is subjected to image processing for watermarks, the print data shown in FIG. 23 is created (the watermarks correspond to WTMs in FIG. 23.).

The aforementioned techniques of the patent documents are techniques for detecting blank space in print data as shown in FIG. 23. For example, if the aforementioned techniques are used to detect blank space in the print data shown in FIG. 23, there is no large blank space detected in any one of the three pages. Accordingly, the print data of the three pages is sent from the PC to the image forming apparatus, in which the print data is then printed on three pages of paper.

In short, the techniques for detecting blank space in print data cannot detect large blank space existing in document data. This results in a problem of low precision in detecting blank space. Moreover, these techniques cannot perform such a process that inserting the drawing object data of the third page of the document data into the second page. Consequently, the third page in which large blank space is generated at the time of creating the document data is also printed, thus leading to waste of paper.

SUMMARY OF THE INVENTION

A main object of the present invention is to increase the precision in detecting blank space and prevent waste of paper.

To achieve at least one of the above-mentioned objects, according to a first aspect of the present invention, there is provided an information processing apparatus for performing image processing for document data created by a document creation application to generate print data of each page and sending the generated print data to an image forming apparatus, the information processing apparatus including: a control section for specifying, based on document data, a region where drawing object data included in the document data exists as a drawing object region, and detecting blank space in each print page based on the specified drawing object region.

Preferably, the control section converts coordinate values of the document data to mask coordinate values for detecting the blank space and refers to a mask having the converted mask coordinate value to specify a coordinate region of the mask corresponding to the region of the document data including the drawing object data as the drawing object region.

Preferably, the information processing apparatus further includes a first input section through which a blank space ratio representing a ratio of the blank space in the print page and a method of detecting the blank space in the print page are inputted.

Preferably, the information processing apparatus further includes a second input section through which whether to perform printing of the document data is selected.

Preferably, the control section uses any one of GDI and XPS print paths as a print path defining how the printing is handled.

According to a second aspect of the present invention, there is provided a computer-readable recording medium storing a program for causing a computer mounted on an information processing apparatus to function as a control unit, the information processing apparatus performing image processing for document data created by a document creation application to generate print data of each page and sending the generated print data to an image forming apparatus, wherein the control section is configured to specify, based on document data, a region where drawing object data included in the document data exists as a drawing object region, and detect blank space in each print page based on the specified drawing object region.

Preferably, the control section converts coordinate values of the document data to mask coordinate values for detecting the blank space and refers to a mask having the converted mask coordinate value to specify a coordinate region of the mask corresponding to the region of the document data including the drawing object data as the drawing object region.

Preferably, the information processing apparatus further includes a first input section through which a blank space ratio representing a ratio of the blank space in the print page and a method of detecting the blank space in the print page are inputted.

Preferably, the information processing apparatus further includes a second input section through which whether to perform printing of the document data is selected.

Preferably, the control section uses any one of GDI and XPS print paths as a print path defining how the printing is handled.

BRIEF DESCRIPTION OF DRAWINGS

The present invention will be completely understood by the following detailed description and the attached drawings. However, these description and drawings are not intended to limit the present invention, and wherein.

FIG. 2 is a flowchart illustrating a setting process;

FIG. 3 is a view showing a blank space detection setting screen;

FIG. 10A is a view showing a mask including particular coordinates;

FIG. 10B is a view showing a mask including a particular line;

FIG. 10C is a view showing a mask not including the particular coordinate and line;

FIG. 15 is a view showing page layout in the case where the number of cells per page is 4×5;

FIG. 17 is a view showing page layout in the case where each page includes five lines and four characters per line at maximum;

FIG. 18 is a view showing page layout in the case where each page includes three lines and five characters per line at maximum;

FIG. 20 is a view showing page layout in the case where each page includes five lines and four characters per line at maximum;

FIG. 21 is a view showing page layout including an outlined letter with a font size large enough to cover the entire page;

FIG. 22 is a view showing an example of document data created by a document creation application; and FIG. 23 is a view showing an example of print data.

PREFERRED EMBODIMENT OF THE INVENTION

Figure 1:
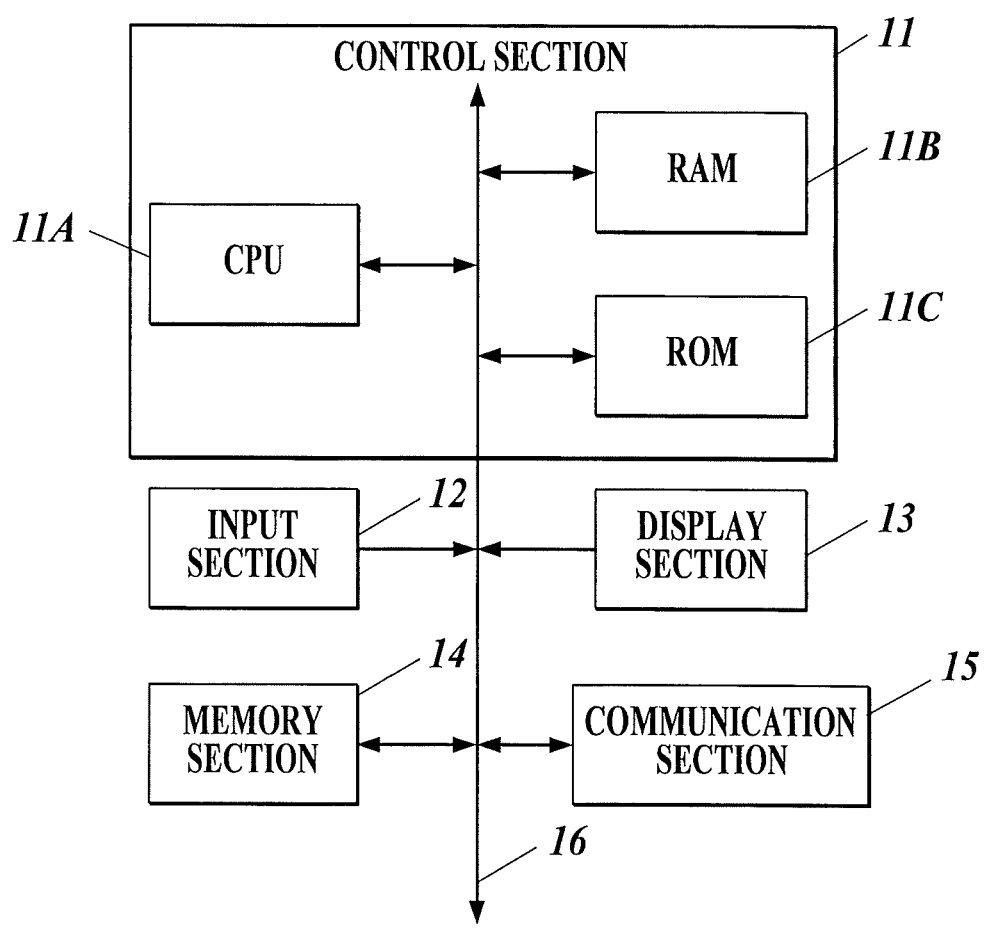
FIG. 1 is an internal block diagram of an information processing apparatus according to an embodiment of the present invention.

Hereinafter, a description of an embodiment of the present invention will be given in detail with reference to the attached drawings. However, the scope of the present invention is not limited to examples in the drawings.

First, with reference to FIG. 1, a description of the internal configuration of an information processing apparatus 1 including a printer driver function will be given. The information processing apparatus 1 is an apparatus configured to perform image processing for document data created by a document creation application to generate print data for each page (print page) and send the generated print data to an image forming apparatus (not shown).

As shown in FIG. 1, the information processing apparatus 1 includes a control section 11, an input section 12 as first and second input sections, a display section 13, a memory section 14, and a communication section 15, which are connected through a bus 16. In this embodiment, the information processing apparatus 1 is assumed to include Windows (registered trademark) as an operating system (OS). Moreover, it is assumed that the print path defining how the printing is handled in Windows (registered trademark) is a GDI (graphical device interface) print path or an XPS (XML paper specification) print path.

The control section 11 includes a central processing unit (CPU) 11A, a random access memory (RAM) 11B, and a read only memory (ROM) 11C.

The CPU 11A executes the operating system (OS) and various programs each stored in the memory section 14. Specifically, under the control by the OS, the CPU 11A reads and loads a specified program among various programs (described later) stored in the memory section 14 into the RAM 11B and executes the various processes in cooperation with the programs loaded in the RAM 11B for centrally control each section of the information processing apparatus 1.

The CPU 11A specifies a region including drawing object data of document data as a drawing object region based on the document data and detects blank space generated in the print page based on the specified drawing object region. Herein, the drawing object data refers to text data composed of letters or symbols or image data composed of a figure or a photograph.

The RAM 11B is a volatile memory and includes a work area storing various programs to be executed by the CPU 11A and data related to the various programs. The RAM 11B temporarily stores the information thereof. The ROM 11C stores various programs and various data.

The input section 12 includes a keyboard provided with cursor keys, numeric keys, various function keys, and the like and outputs a press signal inputted by an operator through the key board to the control section 11. The input section 12 may include a pointing device such as a mouse.

The display section 13 is composed of a liquid crystal display (LCD), a cathode ray tube (CRT), or the like and performs screen display according to a display signal from the control section 11.

The memory section 14 is composed of a hard disk drive (HDD) or the like and stores various programs and various data. Specifically, the memory section 14 stores the operating system (OS), a setting program, a mask data initialization program, a drawing object region specifying program, and a blank space detection program.

The communication section 15 is connected to communicate with the image forming apparatus (not shown) and transmits/receives various information with the image forming apparatus.

Next, with reference to FIG. 2, a description of a setting process executed by the information processing apparatus 1 will be given. The setting process is a process for setting a blank space detection method and a blank space ratio.

For example, an input of an execution instruction to execute the setting process through the input section 12 triggers execution of the setting processing by the CPU 11A in cooperation with the setting program read from the memory section 14 and properly loaded into the RAM 11B.

First, the blank space detection setting screen is displayed (step S1). For example, a blank space detection setting screen 31 shown in FIG. 3 is displayed on the display section 13. Herein, with reference to FIG. 3, the blank space detection setting screen 31 will be described. The blank space detection setting screen 31 includes a blank space detection setting section 32, a blank space ratio setting section 33, an OK button 34, a cancel button 35, and a back-to-normal button 36.

The blank space detection setting section 32 is a setting section configured to receive an input of a selected blank space detection method (a method of detecting blank space in the print page) from the user. The blank space detection setting section 32 allows selection of "not detect blank space", "detect a page break due to image protrusion", "detect layout including large blank space in the bottom", and "detect every large blank space".

The blank space ratio setting section 33 is a setting section configured to receive an input of the blank space ratio from the user. The blank space ratio is a value representing a ratio of blank space in the print page. The OK button 34 is a button pressed to determine information inputted through the blank space detection setting section 32 and blank space ratio setting section 33. The cancel button 35 is a button pressed to cancel the information inputted through the blank space detection setting section 32 and blank space ratio setting section 33. The back-to-normal button 36 is a button pressed to reset the values of the blank space detection method and blank space ratio to normal setting values previously determined.

Back to FIG. 2, after the execution of the step S1, reception of the setting information is executed (step S2). To be specific, an input of the setting information by the user through the blank space detection setting section 32 and blank space ratio setting section 33 is received. Herein, the setting information includes the set blank space detection information and blank space ratio information.

After the execution of the step S2, the setting information is stored (step S3). To be specific, the setting information is stored in the RAM 11B. After the execution of the step S3, the setting process is terminated.

Figure 4:
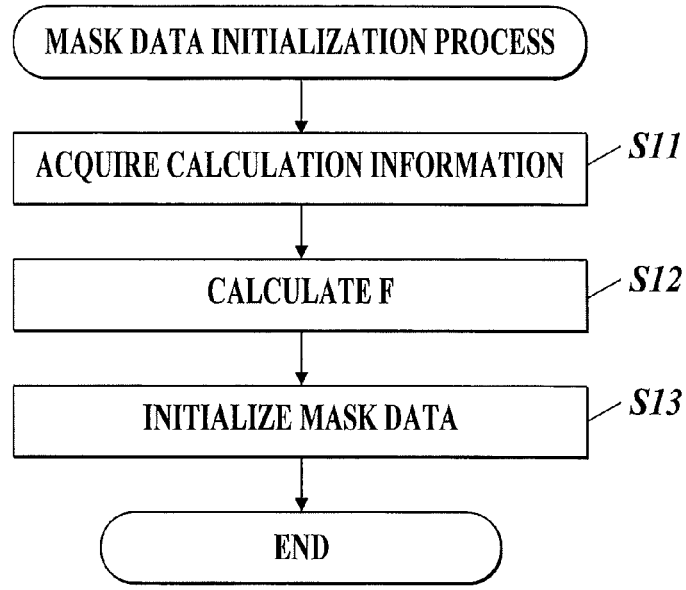
FIG. 4 is a flowchart illustrating a mask data initialization process.

Next, with reference to FIG. 4, the mask data initialization process executed by the information processing apparatus 1 will be described. The mask data initialization process is a process configured to calculate mask coordinate values and initialize mask data of each coordinate in a mask having the calculated mask coordinate values.

For example, an input of an instruction to execute the mask data initialization process through the input section 12 triggers the CPU 11A to execute the mask data initialization process in cooperation with the mask data initialization program read from the memory section 14 and properly loaded into the RAM 11B.

First, calculation information used to calculate coordinate values of the mask is acquired (step S11). The calculation information includes an interval value of setting the blank space ratio (hereinafter, referred to as a setting interval value D), a precision value to secure a predetermined precision for the setting interval value D (hereinafter, referred to as an precision value P), and an area value of a printable region of each page of document data (hereinafter, referred to as an area value S). To be specific, the setting interval value D represents the reciprocal of the number available in setting the increment value of the blank space ratio to be set through the blank space ratio setting section 33 shown in FIG. 3. For example, if the settable values of the blank space ratio range from 0% to 100% in increments of 1%, the setting interval value D is 1/100. The precision value P is a value representing how many times the precision is secured to be larger than the increment value.

After the execution of the step S11, a coordinate conversion factor F is calculated (step S12). The coordinate conversion factor F is a value used to convert document data coordinate values to mask coordinate values. The coordinate conversion factor F is determined by "mask coordinate value=document data coordinate value/F" . . . (1). The document data coordinate values indicate predetermined positions in the document data. The mask coordinate values indicate predetermined positions in the mask (described later).

Herein, a method of calculating the coordinate conversion factor F using the setting interval value D, precision value P, and area value S will be described. First, it is assumed that a printable region of the document data is divided by rectangles corresponding to one dot which is the minimum physical unit of the mask (one pixel). At this time, the number of rectangles (the number of pixels) is expressed by $S/F^2$ . . . (2). If this number of rectangles is larger than the product of the settable number of the blank space ratio (1/D) and the precision value P, the requirement for the minimum mask coordinate value is satisfied. The aforementioned requirement for the minimum mask coordinate value is a minimum condition to keep the precision of detecting blank space. To be specific, the requirement for the minimum mask coordinate value is the minimum mask resolution, the minimum number of all mask coordinates, or the minimum total number of mask pixels. In short, the number of rectangles is expressed with the setting interval value D and precision value P as: the number of rectangles $\geq P/D$ . . . (3). From the expressions (2) and (3), $F \leq (D \times S/P)^{(1/2)}$ . . . (4). Substituting the setting interval value D, precision value P, and area value S obtained at the step S11 into the expression (4), the coordinate conversion factor F is calculated. Herein, it is preferable that the coordinate conversion factor F is an integer for efficient computation. By using the calculated coordinate conversion factor F and the expression (1), the document data coordinate values are converted to the mask coordinate values.

For example, a calculation of the mask coordinate values based on the coordinate conversion factor F calculated in the case where the setting interval value D=1/100 (in increments of 1%), P=10 (the precision of 10 times the setting interval value D), and S=5142×7273 dots (at processing full bleed pages of A4 size (210×297 (mm)) at 600 dpi) will be described.

In this case, using the expression (4), $F \leq (1/100) \times 37397766/10)^{(1/2)} \approx 193.4$. Herein, since the coordinate conversion factor F is preferably an integer, the proper value thereof is 193. The data size of the mask is only 1/37249 ($193^2$) of the data size of the document data. Moreover, the number of coordinates (pixels) to be handled in the later-described blank space detection process is also only 1/37249 (193^2) of that of the document data.

Figure 6:
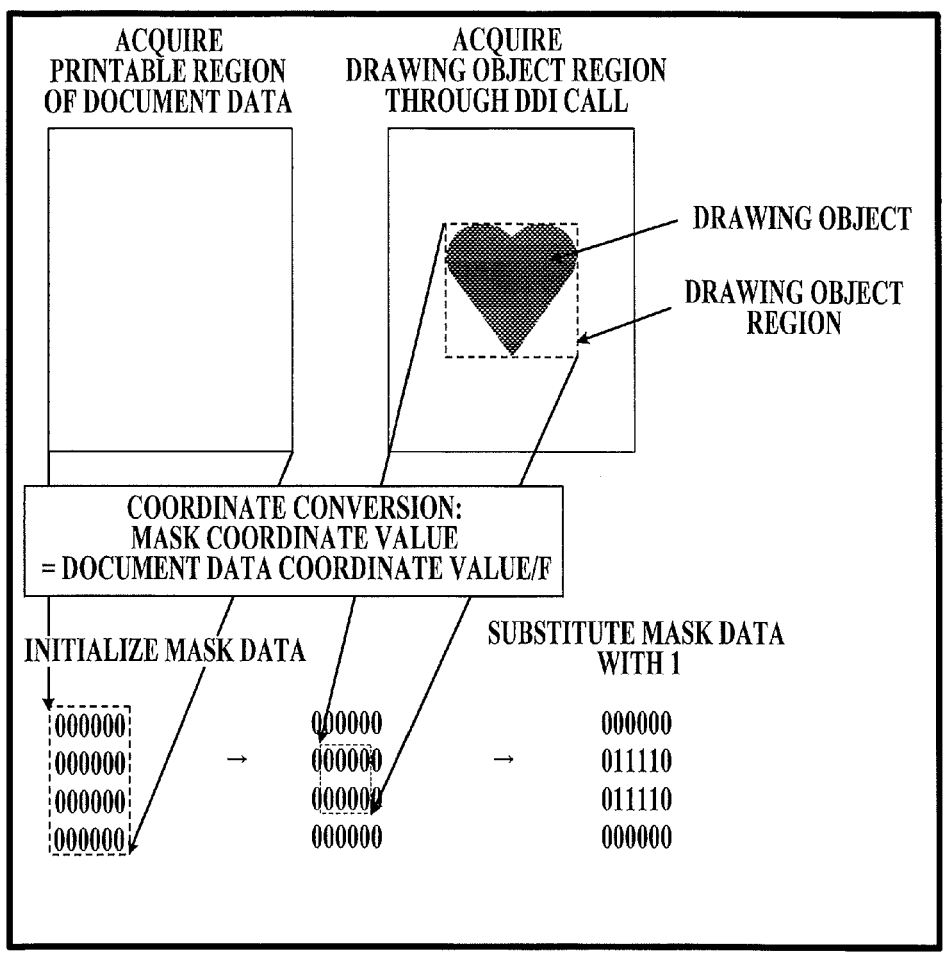
FIG. 6 is a view for explaining the mask data initialization process and a drawing object region acquisition process.

After the execution of the step S12, the mask data is initialized (step S13). Herein, the mask refers to a memory region secured in the RAM 11B separately from a memory used for printing and is a 1-bit bitmap storage region in a coordinate system represented as: "the mask coordinate value=the document data coordinate value/F". The mask data refers to information representing the presence of a drawing object of the document data for each coordinate. The mask data is recorded on the mask. Here, the mask data initialization process will be described with reference to FIG. 6. For example, it is assumed that the document data shown in FIG. 6 is acquired and the document data coordinate values are converted to the mask coordinate values based on the coordinate conversion factor F. In this case, the mask data is initialized by setting 0 at each coordinate in the mask (at all the pixels of the mask including 6 pixels in a row by 4 pixels in a column, for example). After the execution of the step S13, the mask data initialization process is terminated.

Figure 5:
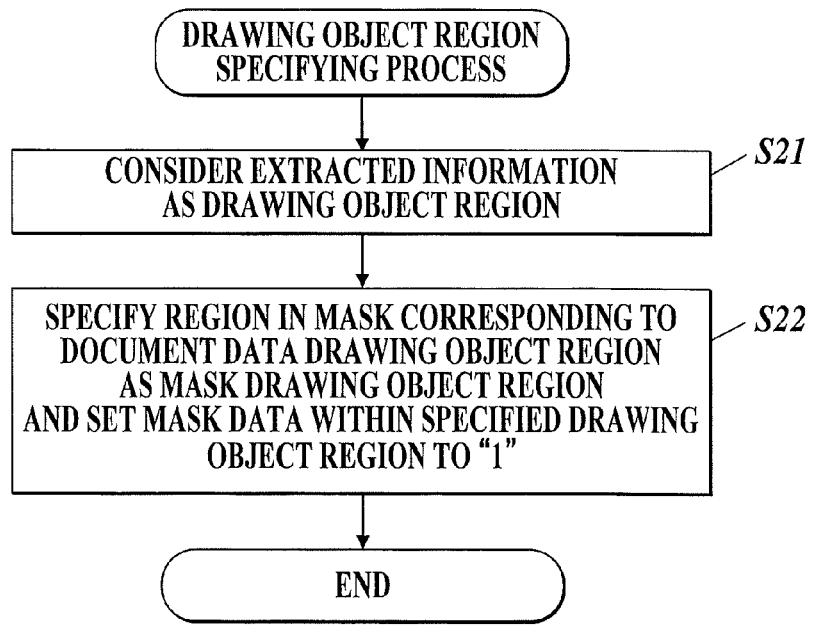
FIG. 5 is a flowchart illustrating a drawing object region specifying process.

Next, the drawing object region acquisition process will be described with reference to FIG. 5. The drawing object region acquisition process is a process for extracting information on the drawing object region included in a drawing instruction, using the extracted information as the drawing object region of the document data to specify a region (coordinate region) of the mask coordinate values overlapping with (corresponding to) the drawing object region of the document data as a mask drawing object region, and setting 1 to the mask data at the coordinates within the specified mask drawing object region.

For example, an input of an instruction to execute the drawing object region acquisition process through the input section 12 triggers the CPU 11A to execute the drawing object region acquisition process in cooperation with the drawing object region acquisition program read from the memory section 14 and properly loaded in the RAM 11B.

Taking a printer driver of the GDI print path as an example, the printer driver receives a drawing instruction from the OS based on the DDI (device driver interface). The printer driver (information processing apparatus 1) extracts the drawing object region included in the drawing instruction and uses the extracted drawing object region as the drawing object region of the document data (step S21).

After the execution of the step 21, the coordinate region in the mask corresponding to the drawing object region of the document data is specified as the mask drawing object region, and the mask data within the mask drawing object region is set to "1" (step S22). For example, when the region indicated by a dashed line in the document data is considered as the document data drawing object region, the coordinate region within the mask corresponding to the document data drawing object region is specified as the mask drawing object region with reference to the mask. Then, each coordinate within the specified mask drawing object region is substituted with the mask data 1. After the execution of the step S22, the drawing object region acquisition process is terminated.

Next, the blank space detection process will be described with reference to FIG. 7. The blank space detection process is a process for detecting blank space in each print page.

For example, an input of an instruction to execute the blank space detection process through the input section 12 triggers the CPU 11A to execute the blank space detection process in cooperation with the blank space detection program read from the memory section 14 and properly loaded in the RAM 11B.

It is assumed that the setting process is previously executed and the setting information (the blank space detection information and blank space ratio information) is previously stored in the RAM 11B.

First, it is judged whether to execute the blank space detection (step S31). Specifically, the blank space detection information stored in the RAM 11B is read out, and the judgment of the step S31 is performed based on the read blank space detection information. For example, when the option of "not detect blank space" is previously selected and inputted by the user in the setting process and the information of "not detect blank space" is stored in the RAM 11B, the judgment in the step S31 is NO. On the other hand, when the information of any one of the options "detect a page break due to image protrusion", "detect layout including large blank space at the bottom", and "detect every large blank space" is stored in the RAM 11B, the judgment in the step S31 is YES.

If the blank space detection is judged not to be executed in the step S31 (step S31; NO), the blank space detection process is terminated.

If the blank space detection is judged to be executed in the step S31 (step S31; YES), the blank space detection information is read from the RAM 11B, and what is the setting of the blank space detection is judged based on the read blank space detection information (step S32).

If it is judged in the step S32 that the setting of the blank space detection is detection of a page break due to image protrusion (step S32; "detect a page break due to image protrusion"), a particular coordinate calculation process is executed (step S33).

Figure 8:
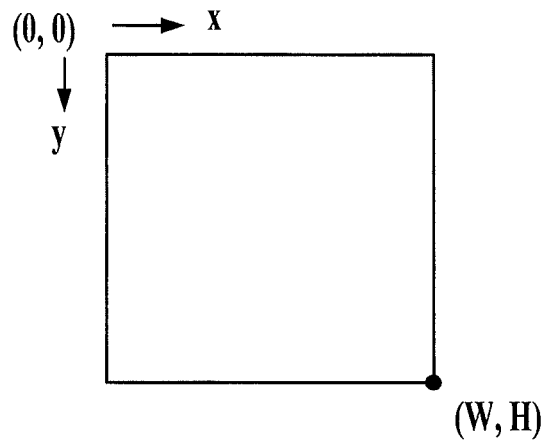
FIG. 8 is a schematic view of a mask.
Figure 9:
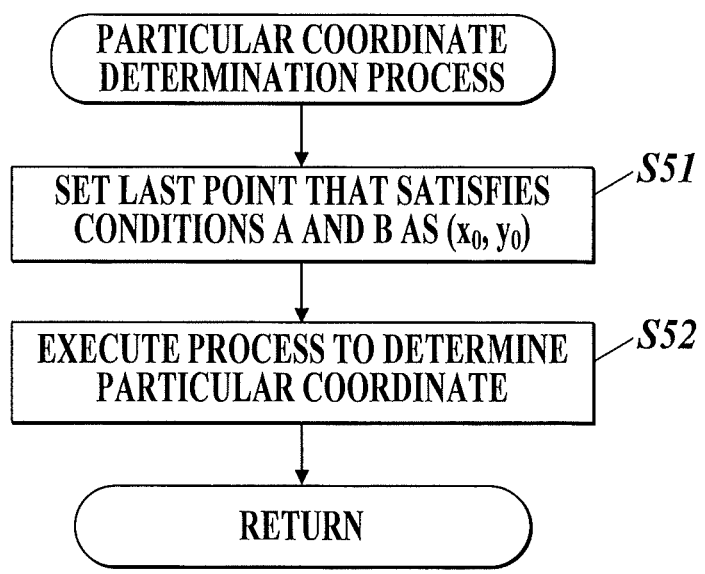
FIG. 9 is a flowchart illustrating a particular coordinate determination process.

Herein, the particular coordinate determination process will be described with reference to FIGS. 8 and 9. FIG. 8 is a schematic view of a mask. As shown in FIG. 8, the upper left end of the mask is set to an origin coordinate (0,0), and the lower right end of the mask is set to (W, H). The rightward direction is indicated by x, and the downward direction is indicated by y.

Hereinafter, the particular coordinate determination process will be described with reference to FIG. 9.

First, each of points $(x_n, y_n)$ on the diagonal line connecting (0,0) and (W, H) is checked starting from (W, H) to (0, 0) whether to satisfy conditions a and b, and the last point that satisfies the conditions a and b is set as $(x_0, y_0)$ (step S51). Herein, the condition a is a condition indicating that the mask data at each point positioned on a line segment connecting $(x_n, y_n)$ and $(W, y_n)$ is 0. The condition b is a condition indicating that the mask data at each point on a line segment connecting $(x_n, y_n)$ and $(x_n, H)$ is 0.

The process to determine a particular coordinate is then executed (step S52). Specifically, if $y_0$ is not less than 1 and the point $(x_n=x_0, y_n=y_0-1)$ satisfies the condition a as to the result of the step 51, whether conditions c and d are satisfied or not is evaluated while decrementing the value of the y-coordinate by 1. Herein, the condition c is a condition indicating that the value of the y-coordinate is not less than 0. The condition d is a condition indicating that the mask data at each point positioned on a line segment connecting $(x_0, y)$ and (W, y) is 0. The $y_0$ is updated to the value of the last y-coordinate that satisfies the conditions c and d, and the obtained $(x_0, y_0)$ is determined as the particular coordinate.

If $x_0$ is not less than 1 and the point $(x_n=x_0-1, y_n=y_0)$ satisfies the condition a as to the result of the step 51, whether conditions e and f are satisfied or not is then evaluated while decrementing the value of the x-coordinate by 1. Herein, the condition e is a condition indicating that the value of the x-coordinate is not less than 0. The condition f is a condition indicating that the mask data at each point positioned on a line segment connecting (x, y$_0$) and (x, H) is 0. The x$_0$ is updated to the value of the last x-coordinate that satisfies the conditions e and f, and the obtained (x$_0$, y$_0$) is determined as the particular coordinate.

Moreover, if the result of the step S51 does not correspond to any one of the case where y$_0$ is not less than 1 and the point (x$_n$=x$_0$, y$_n$=y$_0$−1) satisfies the condition a and the case where x$_0$ is not less than 1 and the point (x$_n$=x$_0$−1, y$_n$=y$_0$) satisfies the condition b, (x$_0$, y$_0$) as the result of the step S51 is determined as the particular coordinate.

After the execution of the step S52, the particular coordinate determination process is terminated, and the procedure proceeds to step S34 of the blank space detection process.

Back to FIG. 7, after the execution of the step S33, whether or not the ratio of an area of a rectangle with the upper left vertex at the particular coordinate and the lower right vertex at the lower right end with respect to the entire area of the mask (hereinafter, the ratio is referred to as a particular rectangle ratio) is higher than the set blank space ratio is judged (step S23). With this step, blank space generated in lower right part of the print page is detected according to the document data drawing object data.

For example, the distribution of mask data shown in FIG. 10A is assumed to be obtained and a portion indicated by a white circle (○) is set as the particular coordinate. Black squares schematically represent regions including the drawing object data. The mask data at each black square is 1. White squares schematically represent regions not including the drawing object data. The mask data at each white square is 0.

In the case of FIG. 10A, there is no mask data of 1 distributed in the range from the particular coordinate to the lower right end. The ratio of the rectangular region including mask data of 0 and ranging from the particular coordinate to the lower right end with respect to the entire area of the mask is calculated as: (the number of squares existing to the lower right of the particular coordinate (11)+the number of the square at the particular coordinate (1)/{(the entire area of the mask (20(=the total number of squares (19)+the number of the white circle (1)}, which is 60%. In this case, if the blank space ratio of 60% is higher than the set blank space ratio (the blank space ratio set by the setting process), the judgment of this step is YES.

Figure 7:
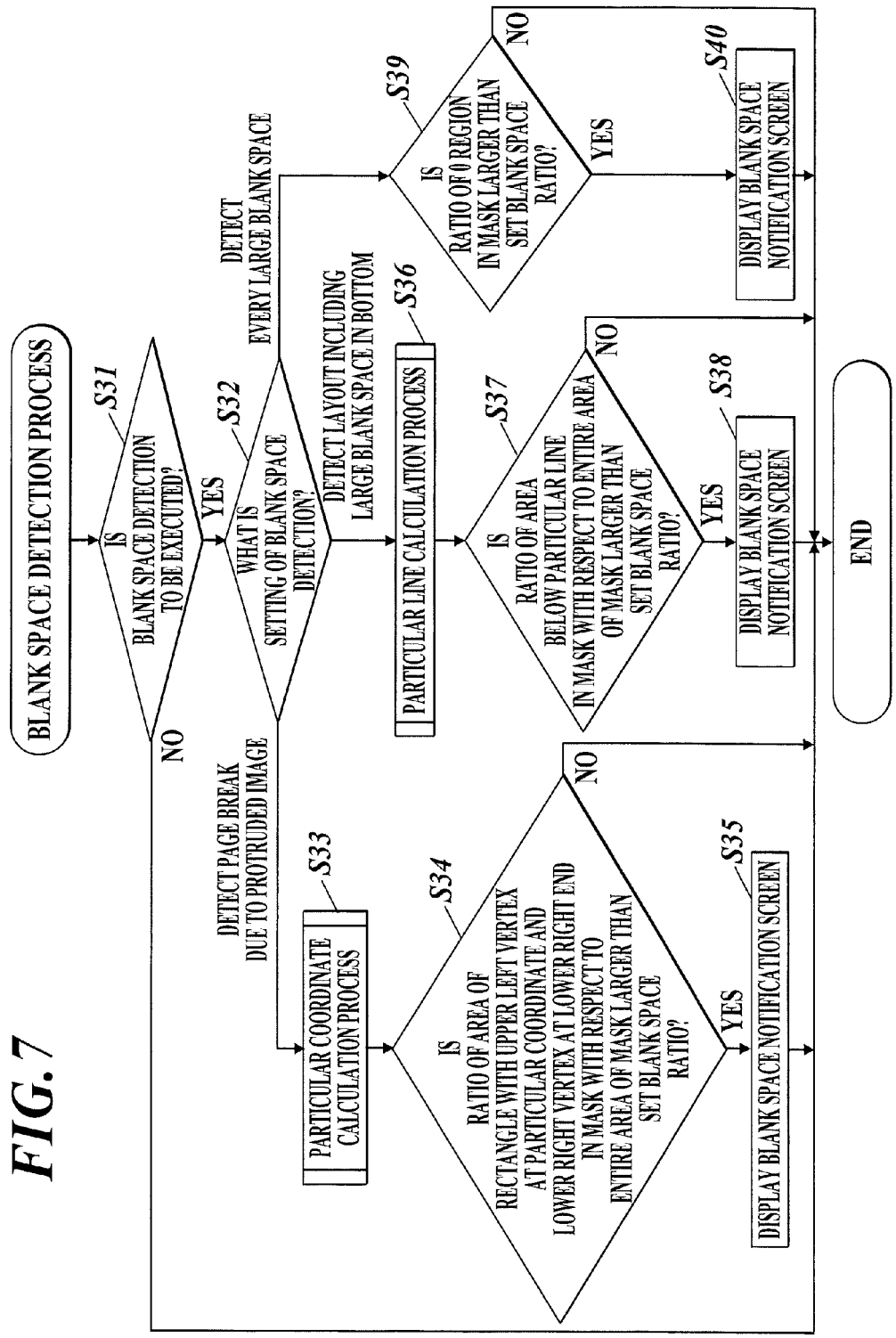
FIG. 7 is a flowchart illustrating a blank space detection process.
Figure 11:
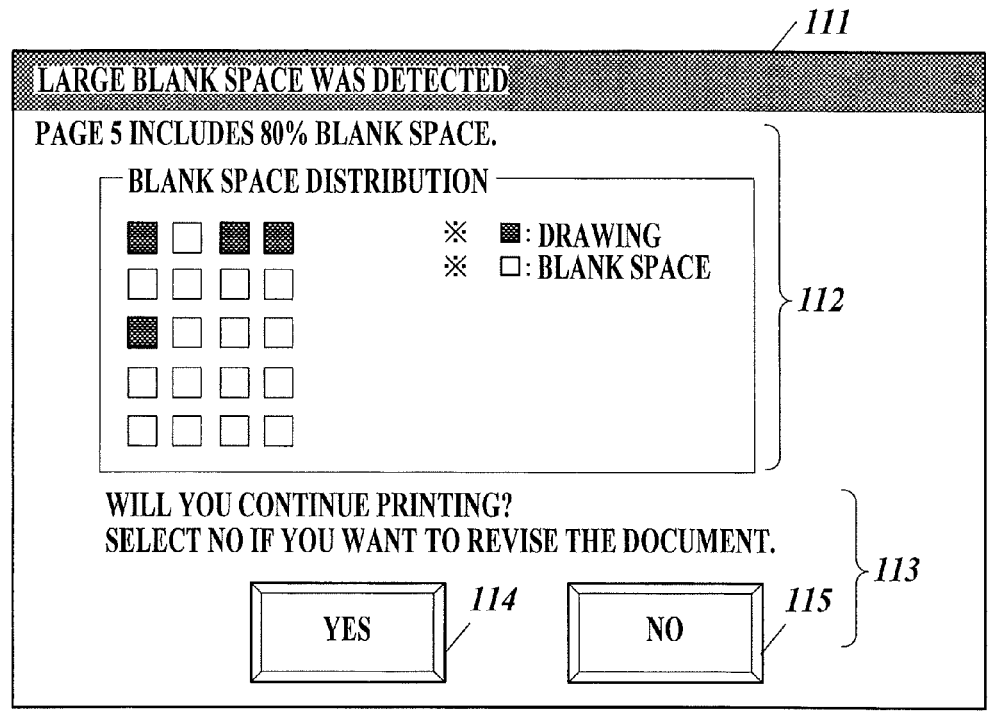
FIG. 11 is a view showing a blank space notification screen.

Back to FIG. 7, if the particular rectangle ratio is judged to be higher than the set blank space ratio in the step S34 (step S34; YES), a blank space notification screen is displayed (step S35). For example, a blank space notification screen 111 shown in FIG. 11 is displayed on the display section 13.

Here, the blank space notification screen iii will be described with reference to FIG. 11. The blank space notification screen in includes a blank space notification display section 112 and a print continuing confirmation display section 113. The blank space notification display section 112 is a display section configured to display the calculated ratio and the distribution of blank space in the mask. The print continuing confirmation display section 113 is a display section configured to cause the user to select whether to continue printing. For example, if the user presses a yes button 114, the printing is continued. On the other hand, if the user presses down a no button 115, the printing is stopped, and the blank space notification screen in returns to the screen for a printing execution application.

Back to FIG. 7, after the execution of the step S35, the blank space detection process is terminated.

If the particular rectangle ratio is judged not to be higher than the set blank space ratio in step S34 (step S34; NO), the blank space detection process is terminated.

Back to the step S32, if the blank space detection method is judged to be detection of layout including large blank space at the bottom (step S32; "detect layout including large blank space in the bottom"), the particular line calculation process is executed (step S36).

Figure 12:
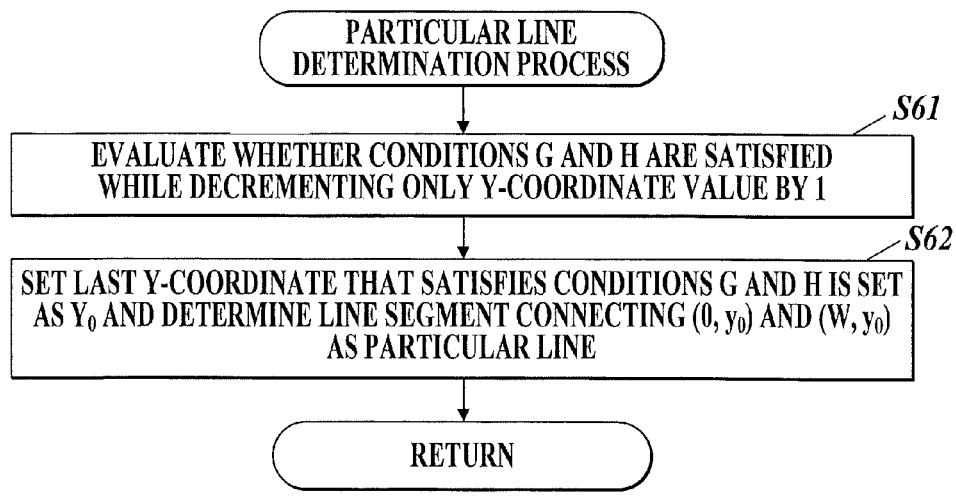
FIG. 12 is a flowchart illustrating a particular line determination process.

Here, the particular line determination process will be described with reference to FIG. 12. As shown in FIG. 8, in a similar way to the particular coordinate determination process, the upper left end of the mask is set to the origin coordinate (0,0), and the lower right end of the mask is set to (W, H). The rightward direction is indicated by x, and the downward direction is indicated by y.

First, whether conditions g and h are satisfied or not is evaluated while decrementing only the value of the y-coordinate from H (step S61). Herein, the condition g is a condition indicating that the value of the y-coordinate is not less than 0. The condition h is a condition indicating that the mask data at each point on a line segment connecting (0, y$_n$) and (W, y$_n$) is 0.

After the execution of the step S61, the value of the last y-coordinate that satisfies the conditions g and h is set as y$_0$, and the line segment connecting (0, y$_0$) and (W, y$_0$) is determined as a particular line (step S62). After the execution of the step S62, the particular line determination process is terminated, and the process proceeds to step S37 of the blank space detection process.

Back to FIG. 7, after the execution of the step S36, whether "a ratio of an area below the particular line to the entire area of the mask" is higher than the set blank space ratio or not is judged (step S37). In other words, in the step 37, detection of blank space generated in the bottom of the print page is executed according to the document data drawing object data.

For example, the distribution of mask data shown in FIG. 10B is assumed to be obtained and the horizontal line is determined as the particular line. In this case, there is no mask data of 1 distributed between the particular line and the bottom end. The ratio of the rectangular region including mask data of 0 between the particular line and the bottom end with respect to the entire area of the mask is calculated as: (the number of squares existing below the particular line (4)+the number of elements "−" constituting the particular line (4)/{(the entire area of the mask (20(=the total number of squares (16)+the total number of elements "−" (4)}, which is 40%. In this case, if the blank space ratio of 40% is higher than the set blank space ratio, the judgment of this step is YES.

If "the ratio of the area below the particular line to the entire area of the mask" is judged to be higher than the set blank space ratio in the step S37 (step S37; YES), the blank space notification screen is displayed (step S38). After the execution of the step S38, the blank space detection process is terminated.

If "the ratio of the area below the particular line to the entire area of the mask" is judged not to be higher than the set blank space ratio in the step S37 (step S37; NO), the blank space detection process is terminated.

Back to the step S32, if the blank space detection method is judged to be detection of every large blank space (step S32; "detect every large blank space"), whether the ratio of part of the mask with mask data of 0 to the entire area of the mask is higher than the set blank space ratio or not is judged (step S39). For example, the distribution of mask data shown in FIG. 10C is assumed to be obtained. In this case, the ratio of part of the mask with mask data of 0 with respect to the entire area of the mask is calculated as (the total number of squares with mask data of 0 (16)/the total number of squares (20), which is 80%. If the blank space ratio of 80% is higher than the set blank space ratio, the judgment of this step is YES.

If the ratio of part of the mask with mask data of 0 to the entire area of the mask is judged to be higher than the set blank space ratio in the step S39 (step S39; YES), the blank space notification screen is displayed (step S40). After the execution of the step S40, the blank space detection process is terminated.

If the ratio of part of the mask with mask data of 0 to the entire area of the mask is judged not to be higher than the set blank space ratio in the step S39 (step S39; NO), the blank space detection process is terminated.

The aforementioned blank space detection using the particular coordinate in the aforementioned blank space detection process shown in FIG. 7 is suitable for the case where document data is generated by an application represented by MS-Excel (registered trademark). The blank space detection using the particular line is suitable for the case where data is generated by an application represented by MS-Word (registered trademark).

For example, when data is created by MS-Excel (registered trademark), the end of each page of the document data depends on the properties of the image forming apparatus (printer) or the size of paper to be printed. Accordingly, if the image forming apparatus is changed or the size of paper to be printed is changed or if print data is sent to the image forming apparatus without being checked on the print preview screen, the page layout thereof is sometimes different from that expected by the user.

Figure 13:
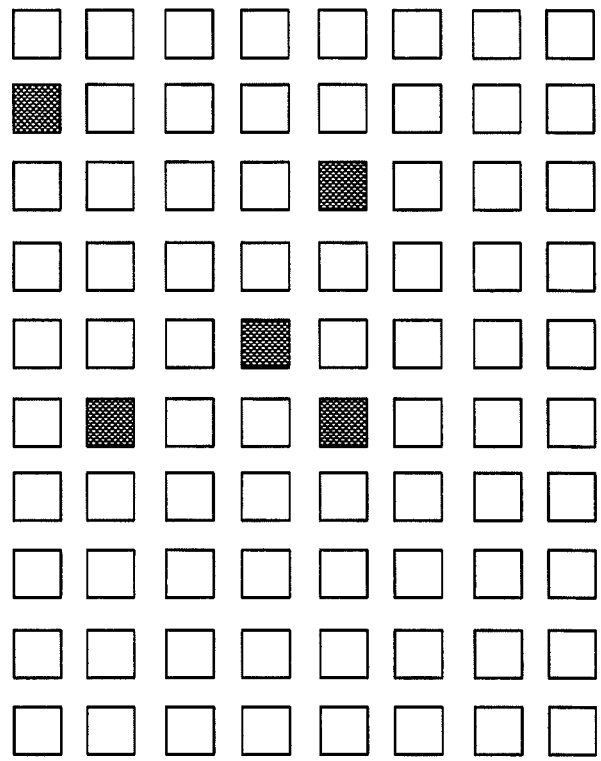
FIG. 13 is a view showing document data created using MS-Excel (registered trademark)

For example, the MS-Excel (registered trademark) is assumed to be used to create document data shown in FIG. 13. The squares in FIG. 13 schematically represent predetermined regions (cells) in the document data. Each of black squares represents a cell where the drawing object data exists. Each of white squares represents a cell where the drawing object data does not exist.

When the number of cells per page in terms of print pages is 5 by 6, the cells including the drawing object data are fit into one page. In this case, the page layout in one page comes to be shown in FIG. 14, for example.

Moreover, if the number of cells per page is 4 by 5, for example, the cells including the drawing object data are not accommodated in one page and protruded to several pages. For example, as shown in FIG. 15, the drawing object data protrudes to the second and subsequent pages and is laid out across four pages. At this time, in the page layout of each of the second and subsequent pages, the drawing object data is located in the upper or left end of the page, thus there is large blank space at the bottom right of the page.

Figure 14:
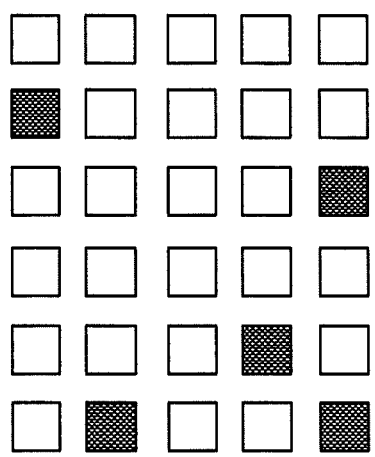
FIG. 14 is a view showing page layout in the case where the number of cells per page is 5×6.

For example, the setting of the page layout of the drawing object data is assumed to be changed because of the replacement of the image forming apparatus, and the drawing object data is assumed to be laid out across four pages as shown in FIG. 15 although the user expects the page layout as shown in FIG. 14. In this case, the page layout is different from that expected by the user, thus resulting in inefficient layout.

At this time, if "detect a page break due to image protrusion" is selected in the blank space detection setting by the user to start blank space detection using the particular coordinate, the blank space detection is performed targeting the lower right part of the page. In this case, there is no blank space detected in the layout shown in FIG. 4 while there is blank space detected in the second and subsequent pages in the page layout shown in FIG. 15. That is, in the case of the page layout shown in FIG. 15, no blank space is detected in the first page, but in each of the second and subsequent pages, a large blank space is detected in the bottom right of the pages. It is therefore possible to select only a page highly likely to have inefficient layout and notify the user of the same.

Moreover, for example, when document data is created with MS-Word (registered trademark), the page width and height of paper size thereof depend on the setting of the image forming apparatus. Accordingly, the page layout is sometimes different from that expected by the user when the image forming apparatus is changed or when the print data is sent to the image forming apparatus without being checked on the print preview screen, for example.

Figure 16:
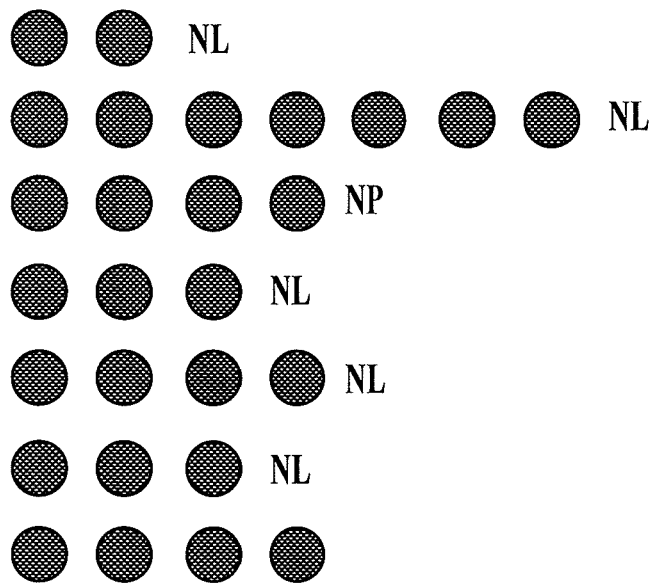
FIG. 16 is a view showing document data created using MS-Word (registered trademark)

For example, the MS-Word (registered trademark) is assumed to be used to create document data shown in FIG. 16. Herein, black circles schematically represent data for one character. NL indicates a line brake code. NP indicates a page brake code.

For example, it is assumed that each page includes five lines and four characters in each line at maximum. In MS-Word (registered trademark), the line break codes and the page break codes can be included in the document data. Moreover, when the number of characters exceeding the page width is specified, a line feed are automatically inserted. This results in the page layout across two pages as shown in FIG. 17. The black squares represent regions including character object data. White squares represent regions not including the character object data.

Moreover, in the case where each page can include five lines and three characters per line at maximum, the layout across four pages is obtained as shown in FIG. 18.

For example, the page layout is assumed to be changed to a page layout shown in FIG. 18 because of the replacement of the image forming apparatus although the user expects the page layout shown in FIG. 17. In this case, the obtained page layout is different from that the user has expected.

Figure 19:
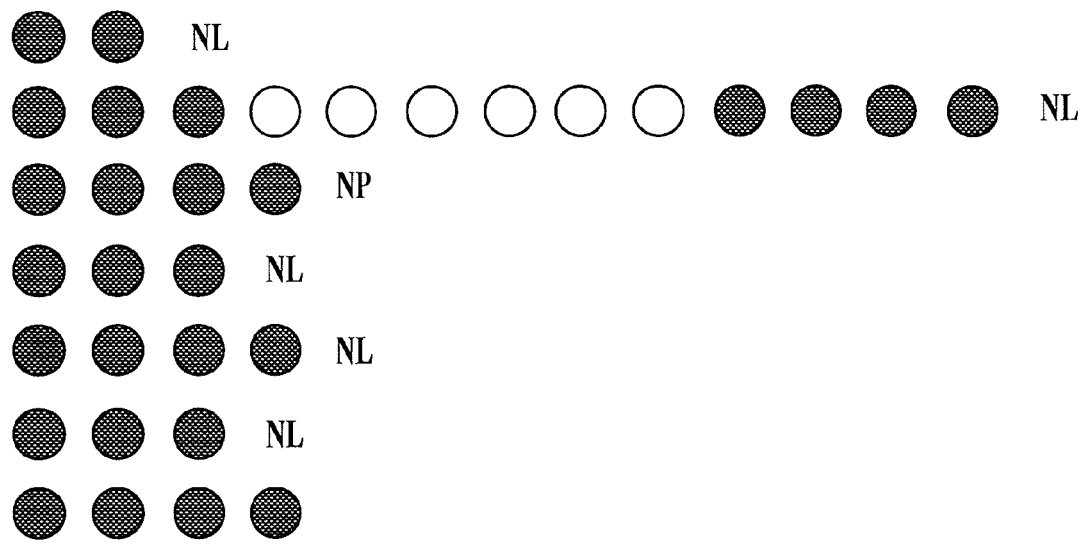
FIG. 19 is a view showing updated document data.

Moreover, if the document data is updated through MS-Word (registered trademark), the page layout is changed and could be sometimes different from that expected by the user. For example, it is assumed that the document data shown in FIG. 16 is updated to the document data shown in FIG. 19. White circles in FIG. 19 represent a portion updated from the FIG. 16. In this case, the document data is laid out across three pages as shown in FIG. 20, and the large blank space generated in the second page due to the newline code could be different from what is expected by the user.

At this time, when the "detect a layout including large blank space in the bottom" is selected by the user in the blank space detection setting to execute the blank space detection using the particular line, the blank space detection is performed targeting the bottom of the page. In this case, there is not blank space detected in the page layout shown in FIG. 17, and blank space is detected in the second and fourth pages in the page layout shown in FIG. 18. In the page layout of FIG. 20, there is blank space detected in the second page. In such a way, the pages are detected as including large blank space at the bottom (the second and fourth pages in the case of FIG. 18 and the second page in the case of FIG. 20). It is therefore possible to select only a page which is highly likely to have inefficient layout and notify the user of the same.

According to the embodiment, blank space generated in each print page is detected based on the drawing object region. Specifically, the coordinate region in the mask corresponding to the drawing object region within the document data is specified as the drawing object region, and blank space generated in each print page is detected based on the specified drawing object region. This makes it possible to previously detect blank space generated within each print page according to the drawing object region in the document data. The blank space detection can be performed in a more fitting way than the case where blank space is detected from print data which are already subjected to processes such as watermarking, N-up processing, and/or zooming in/out processing, thus improving the precision at blank space detection. Moreover, blank space within each print page is previously detected according to the drawing object data of the document data. This allows the user to return to the document creation application and edit the document data if necessary, thus preventing that the pages including large blank space are wastefully printed. It is therefore possible to prevent waste of paper.

Moreover, blank space generated within each print page is detected based on the drawing object region within the mask. Accordingly, the number of coordinates handled in the blank space detection process is less than the number of coordinates in the document data. This can shorten the time taken for the blank space detection process.

Furthermore, the conversion to the mask coordinate values is performed based on the coordinate conversion factor F calculated based on the setting interval value D, precision value P, and area value S. Accordingly, the mask coordinate values can be precisely calculated.

Still furthermore, blank space distributed within each print page is detected using the particular coordinate. Accordingly, even when blank space is distributed at the bottom right within the page of the document data generated by MS-Excel (registered trademark), for example, the blank space distributed at the bottom right of the print page can be detect. It is therefore possible to effectively detect inefficient page layout.

Still furthermore, blank space distributed within each print page is detected using the particular line. Accordingly, even when blank space is distributed at the bottom within the page of the document data generated by MS-Word (registered trademark), for example, the blank space distributed at the bottom of the print page can be detect. It is therefore possible to effectively detect inefficient page layout.

Still furthermore, in the blank space notification screen 111, the calculated blank space ratio and the distribution of blank space in the mask are displayed. Accordingly, the user can refer to the calculated blank space ratio and the distribution of blank space in the mask.

Still furthermore, the user can input a desired blank space ratio and blank space detection method at the blank space detection setting screen 31 through the input section 12.

Still furthermore, the user can select and input at the blank space notification screen 111 through the input section 12 whether to print the document data. Accordingly, when the result from the blank space detection shows a page including large blank space generated when the document data is created, for example, the user can therefore select the no button 115 to edit the page. It is therefore possible to prevent printing of the page including large blank space, thus preventing waste of paper.

Still furthermore, the print path can be a GDI or XPS print path.

Still furthermore, using the particular coordinate or line allows blank space detection to be performed with high precision even for a page including an outlined letter with a font size large enough to cover the entire page. For example, as shown in FIG. 21, in a page including an outlined letter "イ" (pronounced as "i" in Japanese) with a font size large enough to cover the entire page, there is large blank space outside of the letter. Moreover, since the "イ" is an outlined letter, the letter includes blank space inside. If the judgment for the page is performed based on just only the blank space ratio, it is judged that most of the page is composed of blank space. The page shown in FIG. 21 is therefore judged to have inefficient layout as a page including large blank space although the layout of the page is not inefficient. This judging method using only the blank space ratio is not suitable for the case of detecting only blank space due to inefficient layout without considering gap outside of a letter and the inside of an outlined letter as blank space. In the case of detecting only blank space due to inefficient layout, if blank space detection is performed using the particular coordinate or line, the gap outside of a letter and the inside of an outlined letter are not detected as blank space, and the page shown in FIG. 21 is not detected as a page including large blank space, thus achieving highly precise blank space detection.

Description about the aforementioned embodiment is about just examples of the information processing apparatus and recording medium according to the present invention, but the present invention is not limited to the above description. For example, in the aforementioned embodiment, the blank space notification screen 111 is configured to be displayed for each page but may be configured to be displayed for all the pages at one time after the drawing process is finished. In this case, the blank space notification display section 112 displays information on all the pages having high blank space ratios. At this time, the printing job is not sent to the printer unless the yes button 114 is pressed down in the print continuing confirmation display section 113.

In addition, the detailed structure and operation of the information processing apparatus in this embodiment can be properly changed without departing from the scope of the invention.

According to the present embodiment, there is provided an information processing apparatus 1 for performing image processing for document data created by a document creation application to generate print data of each page and sending the generated print data to an image forming apparatus, the information processing apparatus including: a control section 11 for specifying a region included in the document data as a drawing object region based on the document data, the region including drawing object data, and detecting blank space in each print page based on the specified drawing object region.

According to the present embodiment, it is possible to improve the precision of blank space detection and prevent waste of paper.

Preferably, the control section 11 converts coordinate values of the document data to mask coordinate values for detecting the blank space and refers to a mask having the converted mask coordinate value to specify a coordinate region of the mask corresponding to the region of the document data including the drawing object data as the drawing object region.

Preferably, the control section 11 calculates a coordinate conversion factor F for converting the coordinate values of the document data to the mask coordinate values based on a setting interval value D of a blank space ratio representing a ratio of blank space in the print page, a prevision value P representing a precision as to the setting interval value D, and an area value S of a printable region in each page of the document data and performs conversion to the mask coordinate values based on the calculated coordinate conversion factor F.

Preferably, the control section 11 calculates a particular coordinate for detecting blank space distributed in the print page and detects the blank space distributed in the print page based on whether the drawing object region is included in a range from the calculated particular coordinate to lower right of the mask.

Preferably, the control section 11 calculates a particular line for detecting blank space distributed in the print page and detects the blank space distributed in the print page based on whether the drawing object region is included in a range from the calculated particular line to the bottom end.

Preferably, the information processing apparatus 1 further includes a display section 13 for displaying information, wherein the control section 11 calculates a ratio of the blank space included in the range from the particular coordinate to the lower right end in the mask with respect to an entire area of the mask or a ratio of the blank space included in the range from the particular line to the bottom end in the mask with respect to the entire area of the mask and causes the display section 13 to display the calculated ratio and a distribution of the blank space in the mask.

Preferably, the information processing apparatus ii further includes a first input section 33 through which a blank space ratio representing a ratio of the blank space in the print page and a method of detecting the blank space in the print page are inputted.

Preferably, the information processing apparatus 11 further includes a second input section 34, 35 through which whether to perform printing of the document data is selected.

Preferably, the control section 11 uses any one of GDI and XPS print paths as a print path defining how the printing is handled.

According to a second aspect of the present invention, there is provided a computer-readable recording medium 14 storing a program for causing a computer mounted on an information processing apparatus 1 to function as a control unit ii, the information processing apparatus 1 performing image processing for document data created by a document creation application to generate print data of each page and sending the generated print data to an image forming apparatus, wherein the control section 11 is configured to specify a region included in the document data as a drawing object region based on the document data, the region including drawing object data, and detect blank space in each print page based on the specified drawing object region.

According to the present embodiment, it is possible to improve the precision of blank space detection and prevent waste of paper.

Preferably, the control section 11 converts coordinate values of the document data to mask coordinate values for detecting the blank space and refers to a mask having the converted mask coordinate value to specify a coordinate region of the mask corresponding to the region of the document data including the drawing object data as the drawing object region.

Preferably, the control section 11 calculates a coordinate conversion factor F for converting the coordinate values of the document data to the mask coordinate values based on a setting interval value D of a blank space ratio representing a ratio of blank space in the print page, a prevision value P representing a precision as to the setting interval value D, and an area value S of a printable region in each page of the document data and performs conversion to the mask coordinate values based on the calculated coordinate conversion factor F.

Preferably, the control section 11 calculates a particular coordinate for detecting blank space distributed in the print page and detects the blank space distributed in the print page based on whether the drawing object region is included in a range from the calculated particular coordinate to lower right of the mask.

Preferably, the control section 11 calculates a particular line for detecting blank space distributed in the print page and detects the blank space distributed in the print page based on whether the drawing object region is included in a range from the calculated particular line to the bottom end.

Preferably, the information processing apparatus 1 further includes a display section 13 for displaying information, wherein the control section 11 calculates a ratio of the blank space included in the range from the particular coordinate to the lower right end in the mask with respect to an entire area of the mask or a ratio of the blank space included in the range from the particular line to the bottom end in the mask with respect to the entire area of the mask and causes the display section 13 to display the calculated ratio and a distribution of the blank space in the mask.

Preferably, the information processing apparatus 1 further includes a first input section 33 through which a blank space ratio representing a ratio of the blank space in the print page and a method of detecting the blank space in the print page are inputted.

Preferably, the information processing apparatus 1 further includes a second input section 34, 35 through which whether to perform printing of the document data is selected.

Preferably, the control section 11 uses any one of GDI and XPS print paths as a print path defining how the printing is handled.

The entire disclosure of Japanese Patent Application No. 2010-043660 filed on Mar. 1, 2010 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. An information processing apparatus for performing image processing for document data created by a document creation application, to generate print data of each page of a document and send the generated print data to an image forming apparatus, the information processing apparatus comprising:
   a control section configured to:
      analyze document data created by a document creation program, to specify a region of a page of a document where drawing object data included in the document data exists, and
      identify a blank space on the page in which no drawing object is designated by the document data, wherein
   when analyzing the document data, the control section is configured to (i) convert coordinate values of the document data to mask coordinate values for detecting the blank space, (ii) refer to a mask having the converted mask coordinate values to specify a coordinate region of the mask corresponding to the region of the document data including drawing object data as the drawing object region, and (iii) calculate a coordinate conversion factor for converting the coordinate values of the document data to the mask coordinate values based on a setting interval value of a blank space ratio representing a ratio of blank space in the page, a prevision value representing a precision as to the setting interval value, and an area value of a printable region in each page of the document data and performs conversion to the mask coordinate values based on the calculated coordinate conversion factor.

2. The information processing apparatus according to claim 1, wherein the control section calculates a particular coordinate for detecting a blank space distributed in the page and detects the blank space distributed in the page based on whether the drawing object region is included in a range from the calculated particular coordinate to the lower right end of the mask.

3. The information processing apparatus according to claim 2, further comprising a display section for displaying information, wherein
the control section calculates a ratio of the blank space included in the range from the particular coordinate to the lower right end of the mask with respect to an entire area of the mask, and causes the display section to display the calculated ratio and a distribution of the blank space in the mask.

4. The information processing apparatus according to claim 1, wherein the control section calculates a particular line for detecting a blank space distributed in the page and detects the blank space distributed in the page based on whether the drawing object region is included in a range from the calculated particular line to the bottom end of the mask.

5. The information processing apparatus according to claim 4, further comprising a display section for displaying information, wherein
the control section calculates a ratio of the blank space included in the range from the particular line to the bottom end of the mask with respect to the entire area of the mask, and causes the display section to display the calculated ratio and a distribution of the blank space in the mask.

6. The information processing apparatus according to claim 1, further comprising a first input section through which a blank space ratio representing a ratio of the blank space in the print page and a method of detecting the blank space in the print page are inputted.

7. The information processing apparatus according to claim 1, further comprising a second input section through which a selection is made whether to perform printing of the document data.

8. The information processing apparatus according to claim 1, wherein the control section uses any one of GDI and XPS print paths as a print path defining how printing of the document is handled.

9. A non-transitory computer-readable recording medium storing a program for causing a computer mounted on an information processing apparatus to function as a control unit, the information processing apparatus performing image processing for document data created by a document creation application to generate print data of each page of a document and send the generated print data to an image forming apparatus, said program causing the control unit to:
analyze document data created by a document creation program, to specify a region where drawing object data included in the document data exists, and
identify a blank space on the page in which no drawing object is designated by the document data, wherein
when analyzing document data, the program causes the control unit to (i) convert coordinate values of the document data to mask coordinate values for detecting the blank space, (ii) refer to a mask having the converted mask coordinate values to specify a coordinate region of the mask corresponding to the region of the document data including drawing object data as the drawing object region, and (iii) calculate a coordinate conversion factor for converting the coordinate values of the document data to the mask coordinate values based on a setting interval value of a blank space ratio representing a ratio of blank space in the page, a prevision value representing a precision as to the setting interval value, and an area value of a printable region in each page of the document data, and performs conversion to the mask coordinate values based on the calculated coordinate conversion factor.

10. The non-transitory computer-readable recording medium storing the program according to claim 9, wherein the control unit calculates a particular coordinate for detecting a blank space distributed in the page and detects the blank space distributed in the page based on whether the drawing object region is included in a range from the calculated particular coordinate to the lower right end of the mask.

11. The non-transitory computer-readable recording medium storing the program according to claim 10, the program further causing the computer mounted on the information processing apparatus to function as a display section for displaying information, wherein
the control unit calculates a ratio of the blank space included in the range from the particular coordinate to the lower right end of the mask with respect to an entire area of the mask, and causes the display section to display the calculated ratio and a distribution of the blank space in the mask.

12. The non-transitory computer-readable recording medium storing the program according to claim 9, wherein the control unit calculates a particular line for detecting a blank space distributed in the page and detects the blank space distributed in the page based on whether the drawing object region is included in a range from the calculated particular line to the bottom end of the mask.

13. The non-transitory computer-readable recording medium storing the program according to claim 12, the program further causing the computer mounted on the information processing apparatus to function as a display section for displaying information, wherein
the control unit calculates a ratio of the blank space included in the range from the particular line to the bottom end of the mask with respect to the entire area of the mask, and causes the display section to display the calculated ratio and a distribution of the blank space in the mask.

14. The non-transitory computer-readable recording medium storing the program according to claim 9, the program further causing the computer mounted on the information processing apparatus to function as a first input section through which a blank space ratio representing a ratio of the blank space in the print page and a method of detecting the blank space in the print page are inputted.

15. The non-transitory computer-readable recording medium storing the program according to claim 9, the program further causing the computer mounted on the information processing apparatus to function as a second input section through which a selection is made whether to perform printing of the document data.

16. The non-transitory computer-readable recording medium storing the program according to claim 9, wherein the control unit uses any one of GDI and XPS print paths as a print path defining how printing of the document is handled.

17. A non-transitory computer-readable recording medium storing a program for causing a computer mounted on an information processing apparatus to function as a control unit, wherein the information processing apparatus executes a printer driver to perform image processing of document data created by a document creation application to generate print data of each page of a document and send the generated print data to an image forming apparatus, and wherein
the control unit is configured to:
analyze document data created by a document creation program, prior to the document data being subjected to image processing by the printer driver to generate the print data, to specify a region where drawing object data included in the document data exists, and identify, based on said analysis, and prior to the document data being subjected to image processing by the printer driver to generate the print data, a blank space on the page in which no drawing object is designated by the document data, convert coordinate values in a first coordinate system corresponding to the document data to mask coordinate values in a second coordinate system for detecting the blank space, the second coordinate system with a resolution lower than the first coordinate system, and refer to a mask having the converted mask coordinate values to specify a region in the second coordinate system corresponding to the region in the first coordinate system including drawing object data as the drawing object region; and identify the blank space on the page by one of the following, (i) a first detecting method wherein the control unit determines a predetermined coordinate as a particular coordinate based on whether the drawing object region is included in a range from the predetermined coordinate to the lower right end of the mask in the page and detects a blank space from the predetermined coordinate to the lower right end of the mask as the blank space distributed in the page, or (ii) a second detecting method wherein the control unit determines a predetermined line as a particular line based on whether the drawing object region is included in a range from the particular line to the bottom end of the mask in the page and detects a blank space from the particular line to the bottom end of the mask as the blank space distributed in the page.

18. The non-transitory computer-readable recording medium storing the program according to claim 17, the program further causing the computer mounted on the information processing apparatus to function as a first input section through which one of a plurality of detecting methods including the first detecting method and the second detecting method is inputted as a method of detecting the blank space in the page.

\* \* \* \* \*